US008600176B2

(12) United States Patent
Ryu et al.

(10) Patent No.: US 8,600,176 B2
(45) Date of Patent: Dec. 3, 2013

(54) ERROR DETECTION METHOD AND APPARATUS IN DMB RECEIVER

(75) Inventors: Ga-hyun Ryu, Suwon-si (KR); Jeong-hoon Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1851 days.

(21) Appl. No.: 11/227,082

(22) Filed: Sep. 16, 2005

(65) Prior Publication Data
US 2006/0083317 A1 Apr. 20, 2006

(30) Foreign Application Priority Data

Oct. 14, 2004 (KR) ........................ 10-2004-0082314

(51) Int. Cl.
*G06K 9/36* (2006.01)
*H04B 1/66* (2006.01)
*H04N 7/12* (2006.01)
*H04N 11/02* (2006.01)
*H04N 11/04* (2006.01)

(52) U.S. Cl.
USPC ........................ 382/233; 375/240.27; 714/746

(58) Field of Classification Search
USPC .......................................... 382/236; 348/518
See application file for complete search history.

(56) References Cited

U.S. PATENT DOCUMENTS

| | | | | | |
|---|---|---|---|---|---|
| 4,918,523 A | * | 4/1990 | Simon et al. | ............. | 375/240.23 |
| 5,079,630 A | * | 1/1992 | Golin et al. | ............. | 375/240.08 |
| 5,122,873 A | * | 6/1992 | Golin | ....................... | 375/240.23 |
| 5,225,904 A | * | 7/1993 | Golin et al. | ............. | 375/240.12 |
| 5,596,420 A | * | 1/1997 | Daum | ........................... | 386/241 |
| 5,703,877 A | | 12/1997 | Nuber et al. | | |
| 5,805,228 A | * | 9/1998 | Proctor et al. | ........... | 375/240.22 |
| 6,002,802 A | * | 12/1999 | Chujoh et al. | ................ | 382/236 |
| 6,018,376 A | * | 1/2000 | Nakatani | .................. | 375/240.28 |
| 6,067,323 A | | 5/2000 | Imura | | |
| 6,148,135 A | * | 11/2000 | Suzuki | ............................ | 386/12 |
| 6,353,683 B1 | * | 3/2002 | Horiike | ........................ | 382/238 |
| 6,865,431 B1 | * | 3/2005 | Hirota et al. | .................... | 700/94 |
| 6,879,635 B2 | * | 4/2005 | Morimoto et al. | ........ | 375/240.28 |
| 2001/0044711 A1 | * | 11/2001 | Monda et al. | .............. | 704/200.1 |
| 2002/0001351 A1 | * | 1/2002 | Morimoto et al. | ........ | 375/240.28 |
| 2003/0122959 A1 | | 7/2003 | Ishida et al. | | |
| 2005/0024487 A1 | * | 2/2005 | Chen | .......................... | 348/14.13 |

FOREIGN PATENT DOCUMENTS

| | | |
|---|---|---|
| CN | 1244752 | 2/2000 |
| CN | 1304235 | 7/2001 |
| EP | 0 980 152 A2 * | 2/2000 |
| JP | 2001-251621 | 9/2001 |

(Continued)

OTHER PUBLICATIONS

Notice of Allowance in Korean Patent Application 10-2004-0082314 dated May 30, 2012.

(Continued)

*Primary Examiner* — Aaron W Carter
(74) *Attorney, Agent, or Firm* — Staas & Halsey LLP

(57) ABSTRACT

Provided is a method and apparatus for detecting errors generated by a DMB receiver by not processing received audio/video data in realtime. The error detection method includes: calculating a time required to process one frame obtained by dividing received data into frames having a predetermined size; and determining as an error a situation in which the calculated time exceeds time predetermined to process the one frame in realtime and transmitting an error recovering command. Accordingly, subsequent data frames can be normally processed by quickly detecting the error and recovering the error by initializing their associated modules.

17 Claims, 4 Drawing Sheets

(56) References Cited

FOREIGN PATENT DOCUMENTS

| | | |
|---|---|---|
| KR | 1997-0032167 | 6/1997 |
| KR | 2000-0023248 | 4/2000 |
| KR | 10-0302379 | 7/2001 |
| KR | 2002-0030079 | 4/2002 |
| KR | 10-2004-0028226 | 4/2004 |
| KR | 10-2004-0032676 | 4/2004 |
| KR | 10-2004-0035292 | 4/2004 |

OTHER PUBLICATIONS

Office Action issued in corresponding Chinese Patent Application No. 2005101081666 on Apr. 4, 2008.

* cited by examiner

ERROR DETECTION METHOD AND APPARATUS IN DMB RECEIVER

CROSS-REFERENCE TO RELATED APPLICATION

This application claims the benefit of Korean Patent Application No. 10-2004-0082314, filed on Oct. 14, 2004, in the Korean Intellectual Property Office, the disclosure of which is incorporated herein in its entirety by reference.

BACKGROUND OF THE INVENTION

1. Field of the Invention

The present invention relates to a method of detecting errors generated by not processing received data in realtime when receiving a digital multimedia broadcasting (DMB), and more particularly, to a method and apparatus for detecting errors generated by a DMB receiver by not processing received audio/video data in realtime.

2. Description of the Related Art

A DMB receiver is a next generation digital broadcasting receiver that enables services of high quality audio having CD quality, services of various value-added data such as traffic information and securities information, and reception of images having clear picture quality. In order to transmit high quality video and audio data according to the MPEG-2 and MPEG-4 standards, a DMB system encodes various kinds of data, such as images, sound, and value-added data, to MPEG-4 data, multiplexes the encoded data, converts the multiplexed data to an MPEG-2 TS, and transmits the converted MPEG-2 TS.

DMB systems in Korea are based on the Eureka-147 standard. Based on the Eureka-147 standard, audio data is encoded using the Bit Sliced Arithmetic Coding (BSAC) method, and video data is encoded on the basis of the H.264 standard. In the DMB systems, there is no problem to receive a signal when power of a received signal is sufficiently high. However, when a DMB receiver passes through a tunnel, or when power of a received signal is weak, it is difficult to receive a DMB data. Therefore, in order to solve this problem, by performing outer coding of Reed-Solomon (RS) (204, 188) for a Eureka-147 frame, transmission errors generated due to weak power of a received signal can be adaptively dealt with.

In the DMB systems, media data is converted to an MPEG-2 TS and transmitted. Here, the MPEG-2 TS includes a plurality of packetized element streams (PESs). In kinds of the PESs, there exist an audio PES, a video PES, an object descriptor (OD) PES, and a binary format for scene (BIFS) PES. The PESs are decoded by an audio decoder, a video decoder, an OD decoder, and a BIFS decoder, respectively, and displayed to a user.

In order to receive DMB broadcasted in realtime, a DMB receiver must process received data in realtime. However, since the demultiplexed audio PES, video PES, and other PESs are depacketized and decoded, if audio data and video data consecutively received in realtime cannot be quickly processed in a predetermined time, subsequently input audio data and video data cannot be continuously processed.

As described above, various error situations, which a conventional DMB receiver cannot detect, are generated due to following cases: a case where the DMB receiver cannot receive data any more since the DMB receiver moves into a radio shadow area where a reception state of DMB is not good, a case where a burst error is generated due to deterioration of a channel state or low radio intensity, a case where data cannot be normally transferred due to a communication error between a depacketizer and decoders, and a case where decoding of data is delayed due to a decoding time delay of encoded data. In the various error situations, errors cannot be detected using only a conventional error register.

SUMMARY OF THE INVENTION

Additional aspects and/or advantages of the invention will be set forth in part in the description which follows and, in part, will be apparent from the description, or may be learned by practice of the invention.

According to an embodiment of the present invention, there is provided a method and apparatus for detecting errors generated by a DMB receiver by not processing received audio data and video data in realtime.

According to an aspect of the present invention, there is provided an error detection method including: calculating a time required to process one frame obtained by dividing received data into frames having a predetermined size; and determining as an error a situation in which the calculated time exceeds time predetermined to process the one frame in realtime and transmitting an error recovering command.

When the one frame is a video frame, the one frame is a frame composing one picture, and when the one frame is an audio frame, the one frame is the least unit that can be decoded independently.

Operation may include: storing in a register time information obtained when decoding of audio data or video data of the one frame is finished; and updating the register with time information obtained when decoding of audio data or video data of a subsequent frame is finished, calculating a difference value between the time information before the update and the time information after the update, and outputting the difference value as a time required to decode audio data or video data of a frame.

Operation may include: if the required time exceeds time predetermined to process audio data or video data of a frame in realtime, determining the situation as an error and transmitting an error recovering command.

According to another aspect of the present invention, there is provided an error detection apparatus include: a clock counter counting system clocks and outputting a counter value obtained when processing of one frame obtained by dividing received data into frames having a predetermined size is finished; a register storing the output clock counter value; and a determiner determining whether a time required to process the one frame exceeds time predetermined to process the one frame in realtime and outputting an error recovering command.

When the one frame is a video frame, the one frame is a frame composing one picture, and when the one frame is an audio frame, the one frame is the least unit that can be decoded independently.

The determiner may output an error recovering command by determining whether a time required to output a frame by decoding encoded audio data or video data exceeds time predetermined to decode the frame in realtime.

The clock counter may receive information of informing that decoding of audio data or video data of every frame is finished and output clock time information whenever the information is received.

The register may update a value stored in the register with the output clock time information whenever decoding of every frame is finished.

The determiner may receive information of informing that decoding of audio data or video data of one frame is finished, calculate a difference value between a value stored in the register before the update and a value stored in the register after the update, and calculate a time required to decode audio data or video data of the one frame.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
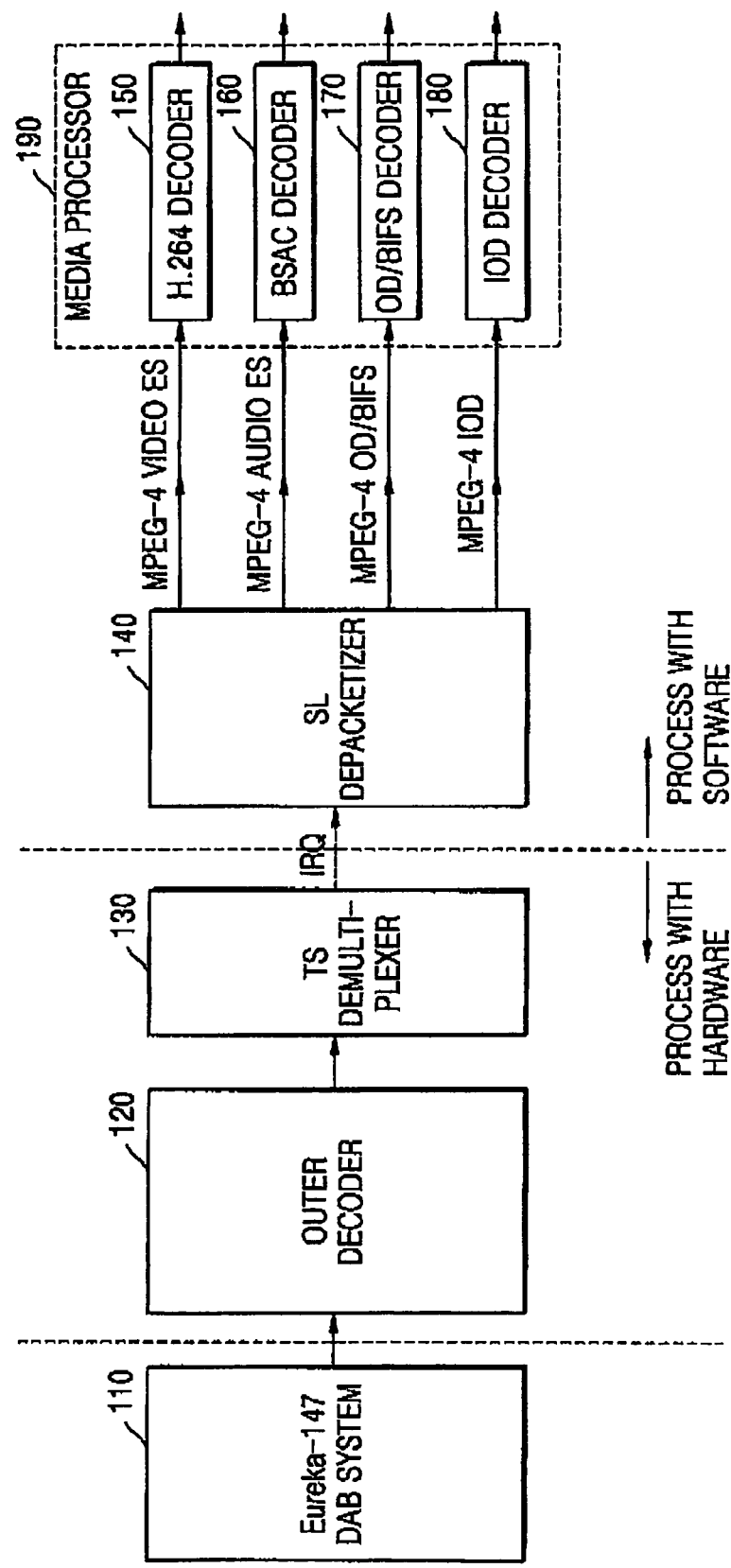
FIG. 1 is a schematic block diagram of a DMB system.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, the present invention will now be described more fully with reference to the accompanying drawings, in which embodiments of the invention are shown.

FIG. 1 is a schematic block diagram of a DMB system.

A stream received from a Eureka-147 digital audio broadcasting (DAB) system 110 is an MPEG-2 TS obtained by performing outer coding, and the MPEG-2 TS includes PES packets generated by encoding audio data, video data, and value-added data to MPEG-4 data and packetizing the MPEG-4 data. The received MPEG-2 TS is RS-decoded by an outer decoder 120. A TS demultiplexer 130 generates an audio PES, a video PES, and value-added PESs by demultiplexing the RS-decoded MPEG-2 TS. An SL depacketizer 140 generates an MPEG-4 video ES, an MPEG-4 audio ES, MPEG-4 value-added data ES by removing SL header from each generated PES. As examples of the MPEG-4 value-added data, there are an MPEG-4 OD/BIFS and an MPEG-4 initial object descriptor (IOD). Each data is decoded and output by a media processor 190.

The media processor 190 includes, for example, a H.264 decoder 150, a BSAC decoder 160, an OD/BIFS decoder 170, and an IOD decoder 180. Error information transmitted from the outer decoder 120 is transmitted to the SL depacketizer 140 by passing through the TS demultiplexer 130 in response to a hardware interrupt signal IRQ and software-processed.

The audio PES, video PES, and value-added PESs generated by the TS demultiplexer 130 are also transmitted to the SL depacketizer 140 in response to an interrupt signal and decodes by the media processor 190. The H.264 decoder 150, BSAC decoder 160, OD/BIFS decoder 170, and IOD decoder 180 included in the media processor 190 decode received video ES, an audio ES, OD/BIFS ES, and IOD data, respectively, in realtime.

Figure 2:
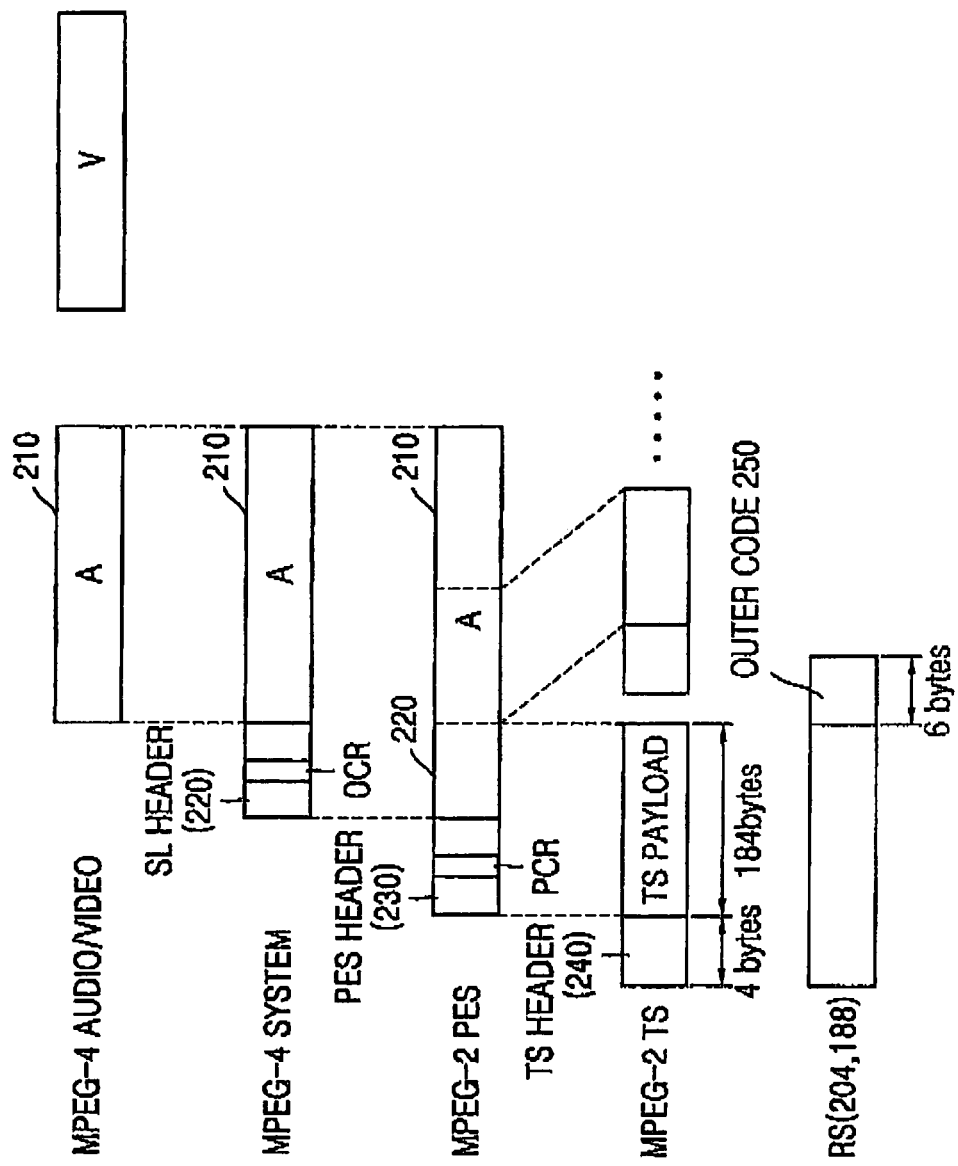
FIG. 2 illustrates a process of generating an MPEG-2 TS in a DMB system.

FIG. 2 illustrates a process of generating an MPEG-2 TS in a DMB system.

Audio data, video data, and value-added data are encoded on the basis of the MPEG-4 format. Only audio data will now be described as an example. However, the video data and value-added data are processed and encoded to MPEG-2 TS through or a similar process. MPEG-4 system data is generated by adding an SL header 230 in front of audio data 210 generated as MPEG-4 data. The SL header 220 includes object clock reference (OCR) information. An MPEG-2 PES is generated by adding a PES header 230 in front of the generated MPEG-4 system data. The PES header 230 includes program clock reference (PCR) information. The MPEG-2 PES is divided into a plurality of TS payloads, each having a size of 184 bytes. MPEG-2 TS packets, each having a size of 188 bytes, are generated by adding a TS header 240 having a size of 4 bytes to each TS payload. Frames obtained by adding an outer code 250 for error verification to each MPEG-2 TS packet in an outer coder are transmitted to a DMB receiver.

Figure 3:
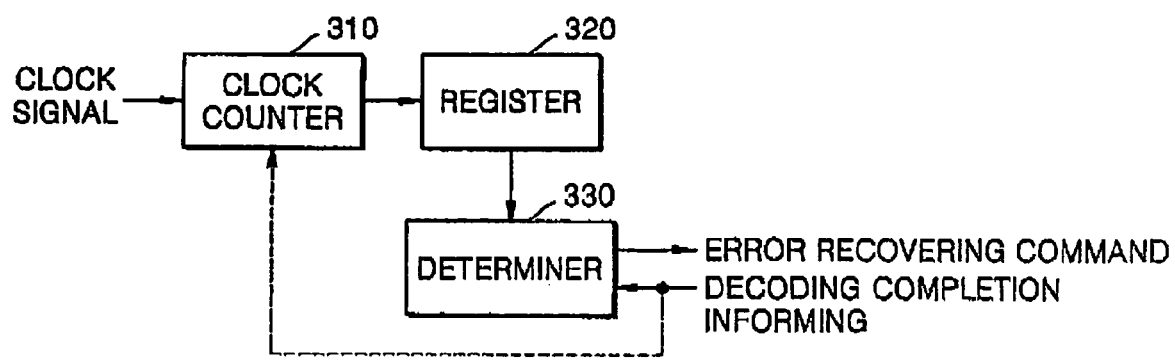
FIG. 3 is a block diagram of an error detection apparatus according to an embodiment of the present invention.

FIG. 3 is a block diagram of an error detection apparatus according to an embodiment of the present invention.

In general, in a DMB system, seamless broadcasting of audio and video can be provided by transmitting encoded audio data at a rate of 43-44 frames/sec and encoded video data at a rate of 30 frames/sec and processing the audio and video data in realtime. Here, one frame is one picture in a case of video and an audio access unit defined in the MPEG standard in a case of audio.

In other words, the TS demultiplexer 130 outputs audio data at the rate of 43-44 frames/sec and video data at the rate of 30 frames/sec defined as described above in based on to interrupt signals. Therefore, time defined to decode one audio frame is ⅟43 sec or ⅟44 sec, i.e., around 22 ms, time defined to decode one video frame is ⅟30 sec, i.e., around 33 ms. Since a subsequent audio frame or video frame cannot be processed in realtime if one audio frame or video frame cannot be processed in a predetermined time, it is determined whether decoding of one frame is completed in the predetermined time, and if the decoding of one frame is not finished in the predetermined time, an audio decoder or a video decoder is initialized so that subsequent data frames can be normally processed.

Referring to FIG. 3, the error detection apparatus includes a clock counter 310, a register 320, and a determiner 330. The clock counter 310 consecutively counts a system clock. When decoding of audio data or video data of one frame is finished in the audio decoder or the video decoder, the clock counter 310 outputs a counter value of the completion time to the register 320. The determiner 330 determines whether a difference between a current counter value and a previously recorded register value at the time when decoding of audio data or video data of one frame is completed is within around 22 ms or 33 ms that is the time predetermined to process each audio frame or video frame. If the difference is not within the predetermined time, the determiner 330 commands its associated decoder or a DMB receiver to initialize its associated decoder or initialize the DMB receiver or its associated channel if it is needed.

The audio frame processing time limit value 22 ms or the video frame processing time limit value 33 ms are not always predetermined and can be shorter or longer according to DMB receiver performance.

Figure 4:
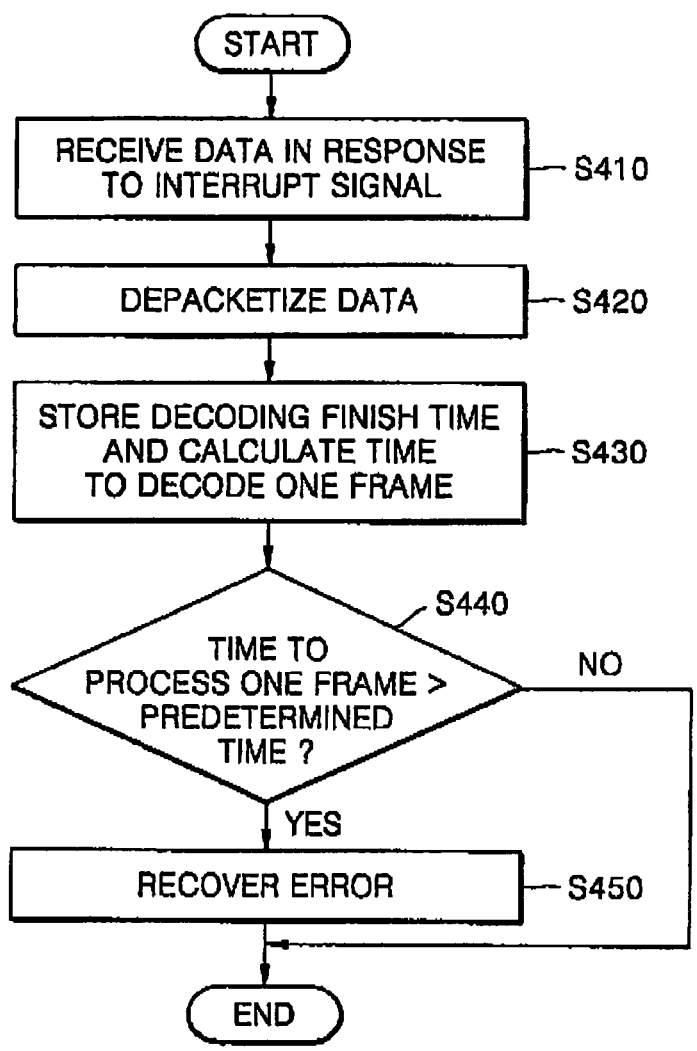
FIG. 4 is a flowchart illustrating an error detection method according to an embodiment of the present invention.

FIG. 4 is a flowchart illustrating an error detection method according to an embodiment of the present invention.

Data demultiplexed by the TS demultiplexer 130 includes an encoded audio PES and an encoded video PES. The demultiplexed audio PES and video PES are received in response to interrupt signals in operation S410. ES data is generated by SL depacketizing the received data and transmitted to the media processor 190 in operation S420. The clock counter 310 consecutively counts a system clock, and if decoding of one frame is finished by inputting data to a decoder included in the media processor 190, the clock counter 310 stores a counter value of that time in the register 320. Since an audio decoder and a video decoder independently exist in the media processor 190, an audio data frame or a video data frame of one frame is separately decoded. When decoding of a subsequent audio data frame or video data frame is completed, the register 320 is updated with a counter value of that time, and a difference value between a previously stored register value and a current counter value is calculated in operation S430.

As described above, time predetermined to process one audio frame is around 22 ms in a case of the audio frame input at the rate of 44 frames/sec, and time predetermined to process one video frame is around 33 ms in a case of the video frame input at the rate of 30 frames/sec. Therefore, if the calculated difference value is within the audio frame processing time limit value or the video frame processing time limit value, it is determined that the decoding of one frame is completed without errors in realtime in operation S440. If the calculated difference value exceeds the audio frame processing time limit value or the video frame processing time limit value, an error recovering command is output in operation S450. That is, it is determined that a problem is generated when the audio frame or video frame decoded in realtime is processed, and initialization to resolve the problem is performed. If an error of which only any one of audio data and video data is input is generated, the DMB receiver is initialized or its associated channel is reset.

Error detection of audio data or video data has been described above. For value-added data, an error also can be quickly recovered by determining in the same way whether a limit that can be processed in a frame unit having a predetermined size is exceeded, detecting the error according to the determining results, and initializing its associated module in response to the error.

The error detection method described above may be realized as a computer program. Codes and code segments composing the computer program may be easily deducted by programmers in the art which the present invention belongs to. And the error detection method may be embodied in a general-purpose computer by running a program from a computer-readable medium, including but not limited to storage media such as magnetic storage media (ROMs, RAMs, floppy disks, magnetic tapes, etc.), optically readable media (CD-ROMs, DVDs, etc.), and carrier waves (transmission over the internet).

As described above, according to embodiments of the present invention, when an error of which one frame cannot be processed in a predetermined time is generated due to generation of errors in an audio decoder and/or a video decoder, subsequent data frames can be normally processed by quickly detecting the error and recovering the error by initializing their associated modules.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. An error detection method of audio and/or video receiving apparatus, comprising:
    decoding one frame obtained by dividing received data into frames having a predetermined size;
    obtaining the time to decode the one frame after decoding of the one frame is completed;
    determining as an error, in realtime, when the obtained time exceeds a predetermined time to decode the one frame; and
    transmitting an error recovering command.

2. The method of claim 1, wherein, when the one frame is a video frame, the one frame is a frame composing one picture, and when the one frame is an audio frame, the one frame is the least unit that can be decoded independently.

3. The method of claim 2, wherein the audio frame is an audio access unit of the MPEG standard.

4. The method of claim 2, wherein the video frame rate is 30 frames/sec, and the audio frame rate is 43-44 frames/sec.

5. The method of claim 1, wherein the obtaining comprises:
    receiving data in response to an interrupt signal and obtaining the time required to process the one frame.

6. The method of claim 1, wherein the received data is encoded audio data or encoded video data, and processing of the data is decoding of the encoded data.

7. The method of claim 1, wherein the obtaining further comprises:
    storing in a register time information obtained when decoding of audio data or video data of the one frame is finished; and
    updating the register with time information obtained when decoding of audio data or video data of a subsequent frame is finished, calculating a difference value between the time information before the update and the time information after the update, and outputting the difference value as the obtained time required to decode audio data or video data of the one frame.

8. The method of claim 7, wherein the time information is obtained by counting a system clock.

9. The method of claim 1, wherein the error recovering command is a command to initialize its associated decoder according to a data frame in which the error is generated or initialize a receiver when sync is not matched by not processing any one of audio and video frames at all.

10. An error detection apparatus of audio and/or video receiving apparatus, comprising:
    a clock counter to count system clocks and to output a first counter value obtained when decoding of one frame obtained by dividing received data into frames having a predetermined size is finished;
    a register to store the first output clock counter value of the one frame and to store a second output clock counter value corresponding to a previously recorded register value at a time when decoding of a previous frame was completed; and
    a determiner to determine a difference between the first counter value and second counter value to obtain a decoding time of the one frame, and to determine, in realtime, whether the time to decode the one frame exceeds a predetermined time, and to output an error recovering command when the obtained decoding time exceeds the predetermined time.

11. The apparatus of claim 10, wherein, when the one frame is a video frame, the one frame is a frame composing one picture, and when the one frame is an audio frame, the one frame is the least unit that can be decoded independently.

12. The apparatus of claim 11, wherein the audio frame is an audio access unit of the MPEG standard.

13. The apparatus of claim 11, wherein the video frame rate is 30 frames/sec, and the audio frame rate is 43-44 frames/sec.

14. The apparatus of claim 10, wherein the clock counter receives information of informing that decoding of audio data or video data of every frame is finished and outputs clock time information whenever the information is received.

15. The apparatus of claim 14, wherein the register updates a value stored in the register with the output clock time information whenever decoding of every frame is finished.

16. The apparatus of claim 10, wherein the determiner receives information of informing that decoding of audio data or video data of one frame is finished, and calculates a time required to decode audio data or video data of the one frame.

17. A non-transitory computer readable medium having recorded thereon a computer readable program for performing an error detection method comprising:
   decoding one frame obtained by dividing received data into frames having a predetermined size;
   obtaining the time to decode the one frame after decoding of the one frame is completed; and
   determining as an error, in realtime, when the obtained time exceeds a predetermined time to process the one frame; and
   transmitting an error recovering command.

* * * * *